United States Patent [19]  
Dünwald

[11] Patent Number: 4,565,843  
[45] Date of Patent: Jan. 21, 1986

[54] LACQUER SOLUTIONS BASED ON HYDANTOIN GROUP-CONTAINING POLYMERS

[75] Inventor: Willi Dünwald, Leverkusen, Fed. Rep. of Germany

[73] Assignee: Bayer Aktiengesellschaft, Leverkusen, Fed. Rep. of Germany

[21] Appl. No.: 683,033

[22] Filed: Dec. 18, 1984

[30] Foreign Application Priority Data

Dec. 31, 1983 [DE] Fed. Rep. of Germany ....... 3347659

[51] Int. Cl.$^4$ .............................................. C08L 75/02

[52] U.S. Cl. .................................. 524/89; 428/425.8; 524/96; 524/100; 524/104; 524/247; 524/248; 524/249; 524/251; 524/252; 524/257; 525/452; 525/540; 528/75; 528/345; 528/423

[58] Field of Search .................. 524/89, 96, 100, 104, 524/247, 248, 249, 251, 252, 257; 528/75, 345, 423; 525/452, 540; 428/425.8

[56] References Cited

U.S. PATENT DOCUMENTS 2,950,262 8/1960 Bush et al. .......................... 521/113  
4,448,942 5/1984 Schulte et al. ...................... 528/363

*Primary Examiner*—Maurice J. Welsh  
*Attorney, Agent, or Firm*—Connolly and Hutz

[57] ABSTRACT

This invention relates to new wire lacquers based on hydantoin group-containing polymers.

6 Claims, No Drawings

LACQUER SOLUTIONS BASED ON HYDANTOIN GROUP-CONTAINING POLYMERS

The production of hydantoin group-containing compounds and the use thereof to produce heat-resistant coatings is known, for example, from DE-OS Nos. 3,144,701; 3,144,700; 3,144,698 and German Patent Application No. 3 247 350.8. They describe the synthesis of such polymers by reacting carbodiimides with $\alpha,\beta$-unsaturated carboxylic acids or carboxylic acid derivatives.

When solutions of such compounds are used to insulate copper or aluminium wires, they provide lacquers which allow high processing speeds and thereby form coatings having excellent properties, such as high softening temperature, excellent behaviour to heat shock and exceptional solvent-resistance (DIN No. 46 453).

The flexibility thereof also meets requirements. However, while the above-mentioned properties are maintained over a broad range of varying stoving conditions, the required flexibility is only achieved when stoving is carried out within a narrow temperature range. If the stoving temperature or the speed at which the wire is passed through the stoving chamber is lowered or raised, the degree of flexibility drops markedly. Thus, when processing, the conditions have to be maintained precisely.

It has now been found that the process may be substantially improved and simplified by addition of amine nitrogen-containing compounds to the polymer solution which has been diluted to the processing consistency.

Thus, an object of the present invention is to provide lacquers for the production of coatings based on hydantoin group-containing polymers, characterised in that from 0.01 to 10%, by weight, based on the solids content, of compounds containing one or more, optionally blocked, primary, secondary or tertiary amine nitrogens are added to a solution of hydantoin group-containing polymers.

The present lacquers may be applied to heat-resistant objects, for example metal objects, such as wires. Such coated objects, for example metal wires, are distinguishable by the improved mechanical properties of the coating. Furthermore, the present lacquers have improved application properties, for example the lacquering speed when lacquering wire may be markedly higher than was hitherto the case. Moreover, the coating produced from the present lacquer is markedly less sensitive to fluctuations in the stoving conditions during application, for example discharge speed and temperature when lacquering the wire, than a coating of lacquers which were hitherto conventional.

Suitable carbodiimide compounds for the production of the hydantoin group-containing polymers used according to the present invention are, for example, monocarbodiimides having an —N=C=N— group in the molecule and the cyclic dimers or trimers thereof or even straight or branched polycarbodiimides having more than two carbodiimide groups in the molecule (e.g. DE-OS No. 3,144,701).

Carbodiimides corresponding to the following general formulae (I) and (II) are preferred:

wherein $R^1$ and $R^2$, which may be the same or different, represent an aliphatic radical having from 1 to 20 carbon atoms, a cycloaliphatic radical having from 5 to 12 carbon atoms, an aliphatic radical having from 6 to 20 carbon atoms, an aromatic radical having from 6 to 16 carbon atoms, a heteroatom (such as an N, O or S) —containing aromatic or cycloaliphatic radical having from 5 to 12 carbon atoms, each of which may optionally be substituted by halogen, chlorine, bromine, iodine, fluorine, nitrile-, $C_1$-$C_6$ alkylamino-, $C_2$-$C_{12}$ dialkyl- or diarylamino, $C_2$-$C_{18}$ alkoxycarbonyl-, $C_1$-$C_{18}$ alkyl-, halogen-$C_1$-$C_{18}$ alkyl, nitro groups or a $C_1$-$C_{18}$ alkylamino-, $C_1$-$C_{18}$ alkoxycarbonyl-, $C_6$-$C_{18}$ glycosyl radical) or a —Si($R^6$)$_3$-, —Sn($R^6$)-, —SO$_2$$R^6$ group (wherein $R^6$ represents $C_6$-$C_{12}$ aryl or $C_1$-$C_8$ alkyl) or may be bound to each other as members of corresponding cyclic organic radicals; and Y is as defined for $R^1$ and $R^2$ and thus preferably represents aliphatic radicals having from 2 to 12 carbon atoms, cycloaliphatic radicals having from 5 to 12 carbon atoms or an aryl radical having from 6 to 16 carbon atoms or diphenyl radicals which are linked via O, S, SO$_2$, CH$_2$, CH$_3$—C—CH$_3$ or CO or —Si($R^6$)$_2$, Sn($R^6$)$_2$ groups; and n represents an integer of from 2 to 2000, preferably from 2 to 1000.

N,N'-symmetrically- and/or asymmetrically-substituted aliphatic, aliphatic-aromatic, cyclic, heterocyclic or aromatic compounds having an —N=C=N— group in the molecule which may optionally be substituted by hetero atoms are used as monocarbodiimides, for example dialkylcarbodiimides, such as dimethyl-, diethyl-, diisopropyl-, dihexyl-, dibutyl-, dinonyl-, didodecyl- and distearyl- carbodiimide, preferably aromatic, optionally substituted monocarbodiimides, such as diphenyl-, ditolyl-, dinaphythyl- carbodiimide, di-(p-iodophenyl)-, di-(p-dimethylaminophenyl)-, di-(pyridyl)-, di-nitro-, alkoxy, -aroxy-, -chloro-, -dichloro-, -trichloro-, -tetrachloro-, -pentachloro-, -benzyl-, -p-bromophenyl- carbodiimide or carbodiimide dibenzoic acid esters, -di-phthalic acid esters, -diisophthalic esters, carbodiimide-dibenzonitrile, cycloaliphatic carbodiimides, such as diallyl-, dioleyl- and dicyclohexenyl-carbodiimide.

These carbodiimide compounds may be produced by known processes, for example from suitable thioureas in the presence of metal oxides, mercury salts, sodium salts, aryl-sulphochlorides or by oxidising thioureas or from S-alkylisothioureas, urea compounds, as are, for example, given in Chem Rev. 67.2 (1967), P 107 or from suitable isocyanate compounds with the separation of carbon dioxide in the presence of certain known catalysts for separating CO$_2$ (FR-PS No. 1,180,307).

Furthermore, the N-sulphonyl carbodiimides RSO$_2$N=C=NR, the N-aminocarbodiimides RN=C=NR$_2$ or the N,N'-disilylcarbodiimides, such as are, for example, given in Chem, Rev. 67,2 (1967), P 107, may also be used.

Aliphatic, cycloaliphatic, araliphatic aromatic and heterocyclic straight or branched polycarbodiimides having more than two carbodiimide groups may also be used as starting components, as may mixtures thereof or polycarbodiimides which have a statistical composition or a block-like structure of different structural elements in a certain sequence length in the polymer molecule and thus may contain the above-mentioned aliphatic, cycloaliphatic, araliphatic, aromatic and heterocyclic structural units in the most varied ratios, both statistically-distributed and arranged in blocks in the polymer molecule.

If the polycarbodiimides are synthesized with two or more carbodiimide groups in the molecule from polyfunctional isocyanates, catalysts known from the relevant literature (c.f., for example, FR-PS No. 1,180,307) for example phospholines, phospholidine sulphides or even organic compounds of metals of Groups Ia-IIIa, for example phenyl lithium, diethyl zinc, may be used.

Thus, the polycarbodiimide compounds may be produced from polyisocyanates, as are comprehensively listed, for example in Annalen 562, P. 75-136; Am. Chem. J. 45, 383; DE-OS No. 2,714,655; U.S. Pat. No. 3,397,253; EP-PS No. 0012379.

Mixtures of poly-toluylene carbodiimides (2,4- and 2,6- substitution products), poly-m-phenylene carbodiimides, and polycarbodiimides based on aniline/formaldehyde condensates having a polyphenylene-methylene structure and poly-4,4'-diphenyl ether-, poly-p-phenylene, poly-1,5-naphthylene carbodiimides, polyisophorone-carbodiimides and polyhexamethylene carbodiimides and/or mixtures thereof, and block polycarbodiimides, for example having the following structures:

-B-B-B-A-A-A-A-B-B-B-
-C-C-B-B-B-A-A-A-A-B-B-B-C-C- wherein A represents, for example, an aromatic structural element, such as diphenylmethane; B represents an aliphatic radical R, such as the isophorone radical; and C represents an aromatic unit, such as a toluylene or naphthylene group; are particularly preferred. These block polycarbodiimides may, for example, be produced by carbodiimidising in successive stages the individual polyfunctional isocyanates which are used. The above-mentioned structures and commercially easily-obtainable difunctional isocyanates illustrate the variation range with regard to sequence length and quantity ratios of the individual members, and the polycarbodiimides may also be specifically branched if, for example, tri- and polyfunctional isocyanates are used in the carbodiimidisation stages.

It is occassionally advantageous in the production of the hydantoin group-containing polymers used according to the present invention partially to mask the isocyanates used and after successful conversion with the $\alpha,\beta$-unsaturated carboxylic acid or derivatives thereof to carry out a further reaction with carboxylic acids or derivatives thereof which contain at least one further acyl urea-reactive group, according to German Patent Application No. 3 247 250.8.

Thus, those isocyanates which have been partially substituted by acylurea groups and which are reaction products of polyisocyanates and lactams may be used. From 0.5 to 0.005 mols, preferably from 0.2 to 0.02 mols, of lactam are reacted per val of isocyanate.

Suitable lactams are, for example, pyrrolidone, dodecane lactam, preferably caprolactam.

Those polyisocyanates which are, for example, described in German Patent Application No. 3 204 129.2 may be used as isocyanates for reacting with lactams. Polyiso(thio)cyanates corresponding to the following general formula:

$$R_1(-NCO)_z \text{ or } R_1(-NCS)_z \qquad (III)$$

wherein
$R_1$ represents an aliphatic radical having from 1 to 20 carbon atoms which has optionally been substituted by halogen, alkyl and/or aryl groups, an aromatic radical having from 5 to 12 carbon atoms, a cycloaliphatic radical having from 5 to 13 carbon atoms, an aliphatic-aromatic radical having from 6 to 20 carbon atoms and a cyclic radical containing up to three hetero atoms, such as N, O or S, which may be aromatic or aliphatic and has from 5 to 12 ring atoms;
are preferably used.

Aliphatic radicals having from 2 to 12 carbon atoms or an aryl radical, such as phenyl, tolyl, diphenyl methane or diphenyl ether radicals, are particularly preferred. z represents an integer of from 2 to 4, preferably, from 2 to 3, more particularly 2.

Commercially easily-obtainable mixtures of tolyulene-diisocyanates, m-phenylene diisocyanate, and phosgenated condensates of aniline and formaldehyde having a polyphenylene-methyl structure and symmetrical compounds, such as 4,4'-diisocyanato-diphenyl methane, 4,4'-diisocyanato-diphenyl ether, naphthylene diisocyanate, p-phenylene diisocyanate, 4,4'-diisocyanato-diphenyl-dimethyl methane, analogous hydroaromatic diisocyanates, and aliphatic diisocyanates having from 2 to 12 carbon atoms, such as hexamethylene diisocyanate and diisocyanates derived from isophorone, are preferably used.

Mixtures of isocyanates may also be used instead of the individual isocyanates. Moreover, the polyisocyanates may be admixed in a quantity of from about 0.1 to 10 mol% with monoisocyanates, for example methyl- or phenyl-isocyanate, for example to influence the molecular weight.

The carbodiimides are produced from the above mentioned acrylisocyanates, preferably using catalysts, at a temperature of from 0° to 200° C., preferably from 20° to 90° C.

Suitable catalysts are, for example phospholines, phospholine oxides, such as 3-methyl-1-phenyl phospholine oxide, phospholine sulphides or organo metallic compounds, such as phenyl lithium and diethyl zinc. A commercial mixture of 1-methyl-1-phospha-2- and 1-methyl-1-phospha-3-cyclopentene-1-oxide (methyl phospholine oxide) is most preferably used as catalyst.

Suitable derivatives of $\alpha,\beta$-unsaturated carboxylic acids preferably correspond to the following general formula (I)

$$\overset{R^3}{\underset{|}{HOOC-C}}=\overset{R^4}{\underset{|}{C}}-COR^5 \qquad (IV)$$

wherein
$R^5$ represents $-OR^6$ or

$R^3$ and $R^4$ represent hydrogen or lower alkyl (preferably having from 1 to 6 carbon atoms); and
$R^6$, $R^7$ and $R^8$ represent alkyl (preferably $C_1$–$C_{20}$, such as methyl, ethyl, iso-propyl, hexyl, undecyl, eicosyl), cycloalkyl (preferably $C_5$–$C_{10}$, such as cyclopentyl, cyclohexyl, cycloheptyl and cyclodecyl), alkenyl (preferably $C_2$–$C_{20}$, such as allyl, butenyl, pentenyl, decenyl and eicosenyl), alkynyl, (preferably $C_2$–$C_{20}$, such as propargyl, butynyl, pentynyl, hexynyl, octynyl, and eicosenyl), aryl (preferably $C_6$–$C_{10}$, such as phenyl and naphthyl) and aralkyl (preferably having from 6 to 10 carbon atoms in the aryl moiety and from 1 to 4 carbon atoms in the alkyl moiety such as benzyl, cresyl, naphthylmethyl) and $R^7$ and $R^8$ may also represent hydrogen.

Examples of suitable derivatives of $\alpha,\beta$-unsaturated carboxylic acids are, for example, described in DE-OS Nos. 2,654,112; 2,657,560; 2,750,771, 2,758,569 and 3,003,773.

The monoesters of maleic acid and fumaric acid, for example methyl-, ethyl-, isopropyl, undecyl-, cyclohexyl-, benzyl, allyl-, propargyl, and phenyl-monofumaric acid esters and -monomaleic acid esters are preferably used as derivatives of $\alpha,\beta$-unsaturated carboxylic acids.

In a particular embodiment of the present process mixtures or partially reacted mixtures of $\alpha,\beta$-unsaturated cyclic dicarboxylic acid anhydrides and of hydroxy compounds, preferably aromatic hydroxy compounds, (for example known from DE-OS No. 2,654,112) may be used instead of the derivatives of $\alpha,\beta$-unsaturated carboxylic acids. Mixtures of maleic acid anhydride and, for example phenol or o-, m-, or p-cresols are preferably used in this embodiment of the present process.

Usable carboxylic acid or carboxylic acid derivatives which contain at least one acyl urea-reactive group, are, for example, aliphatic and aromatic dicarboxylic acids, such as adipic acid, iso- and terephthalic acid, $\alpha,\beta$-unsaturated carboxylic acids, such as corresponding to the above general formula IV, aliphatic and aromatic polycarboxylic acids and the anyhydrides thereof, as are described in DE-OS Nos. 1,720,696 and 2,535,335 for example trimesic acid, trimellitic acid anhydride, butane tetracarboxylic acid dianhydride, pyromellitic acid dianhydride, benzophenone tetracarboxylic acid dianhydride and 2,2-bis-[4-(3,4-dicarboxyphenoxy)-phenyl]-propane dianhydride and bisglycines or esters thereof, as are described in OE-P No. 1,570,552, for example bis-[methoxycarbonylisopropylaminophenyl]-methane, 2,2-bis(ethoxycarbonylmethylamino-phenyl)-propane and 4,4'-bis[methoxycarbonylisopropylamino]-diphenyl ether. Monocarboxylic acids, such as formic acid and benzoic acid, and monoglycine esters, such as phenylaminoacetic acid ethyl ester may be used portion-wise, preferably in a stoichiometric ratio of from 1 to 10 mol %, to regulate the molecular weight.

Carboxylic acids, such as fumaric acid monoalkyl esters, for example fumaric acid monoethyl esters, most preferably trimellitic acid anhydride and bis-[methoxycarbonylisopropyl amino phenyl]-methane or mixtures thereof are preferably used. 1 val of the $\alpha,\beta$-unsaturated carboxylic acid derivative is generally used per equivalent of carbodiimide. 1 val of anhydride, 1 val of carboxylic acid, 1 val of glycine ester or 1 val of fumaric or maleic amide acid ester or 0.5 val of $\alpha,\beta$-unsaturated carboxylic acid derivative are used per val of the acylurea produced from isocyanate and lactam.

The reaction may be influenced by catalysts, such as are, for example, given in DE-OS No. 3,003,773. The use of amines, for example 1,4-diazabicyclo-(2,2,2)-octane, triethylamine, N,N-bis-(dimethyl-aminoethyl)-methylamine, N,N-dimethylaniline, N-ethylmorpholine, and 4-dimethylamino-pyrrolidine, of lactams, such as caprolactam and pyrrolidone and of phenols, such as phenol and o, m, or p-cresol has proved to be particularly favourable.

The reaction may be carried out in solvents, which are inert under the reaction conditions or form only loose addition compounds. Suitable solvents are: (halogen)-hydrocarbons, phenols, alcohols, esters, lactones, lactams, ethers, nitriles, phosphoric acid amides, sulphoxides and sulphones, for example methylene chloride, carbon tetrachloride, tetrachloroethane, trichloroethylene, xylenes, o-dichlorobenzene, phenol, cresols, benzoic acid alkyl esters, phthalic acid dimethyl ester, butyrolactone, caprolactone, acetophenone, cyclohexanone, benzyl alcohol, ethylene glycol, glycol monoethyl ether acetate, diethylene glycol monoethyl ether, diethylene glycol dimethyl ether, dimethyl formamide, N-methyl pyrrolidone, caprolactam, benzonitrile, hexamethylphosphoric acid triamide, dimethyl-sulphoxide, tetramethylene sulphone and mixtures thereof.

Methylene chloride is preferably used as solvent for obtaining the polycarbodiimide. A preferred embodiment involves producing the carbodiimide in toluene, for example, and then adding methylene chloride before the reaction with the $\alpha,\beta$-unsaturated carboxylic acids. The more valuable condensation stage may then be carried out after addition of relatively high boiling solvents, such as phenol, commercial cresol mixtures, dimethylformamide and N-methyl pyrrolidone, optionally while distilling off the methylene chloride and other readily volatile solvent components.

It may be advantageous to carry out the addition of the $\alpha,\beta$-unsaturated carboxylic acids to the carbodiimides in the presence of aromatic hydroxy compounds, such as phenol, aliphatic hydroxy compounds, such as methanol, or lactams, such as caprolactam and pyrrolidone. The progress of the reaction may be followed by IR-spectroscopy.

In a particularly preferred embodiment, the substituted isocyanate which is partially formed by the addition of lactams to isocyanates is firstly converted to the carbodiimide. Then the $\alpha,\beta$-unsaturated carboxylic acid is added to this carbodiimide and subsequently or simultaneously condensed to completion after addition of the substituted acylurea-reactive carboxylic acid.

A further embodiment involves using mixtures of isocyanates and lactams or mixtures of partially carbodiimised isocyanates and lactams to produce acylated carbodiimides.

From 0.5 to 0.005 mols of lactam are generally used per mol of isocyanate, 1 val of the $\alpha,\beta$-unsaturated carboxylic acid derivatives is generally used per val of carbodiimide and 1 val of the substituted carboxylic acids is generally used per val of the acylurea, based on the reactive groups.

From 0.01 to 10%, preferably from 0.03 to 5%, calculated on the solids content of the solution of, compounds having one or more optionally blocked primary, secondary or tertiary nitrogen atoms are added to the hydantoin group-containing polymer solution-based lacquers to improve the coating produced therefrom.

The compounds may be added in substance, i.e. undiluted. It may also occasionally be advantageous to produce a solution of these compounds and to add this solution. Optionally improved mixing and thus a homogeneous distribution is more easily achieved by this method. The use of heat during the addition may also be useful, as is the adition of these compounds at the same time as the solvents when adjusting the lacquer to the processing consistency.

The following are examples of suitable compounds which may be used individually or in admixture for the purposes of the present invention: triethylamine, tributylamine, N-methyl-morpholine, N-ethyl-morpholine, N-cocomorpholine, N,N,N',N'-tetramethyl-ethylene diamine, 1,4-diazabicyclo-(2,2,2)-octane, N-methyl-N'-dimethylaminoethyl-piperazine, N,N-dimethyl-benzylamine, N,N-diethylene benzylamine, pentamethyl-diethylene triamine, N,N-dimethyl-cyclohexylamine, N,N,N'-N'-tetramethyl-1,3-butane diamine, N,N-dimethyl-β-phenyl ethylamine, 1,2-dimethylimidazole, 2-methylimidazole, triethylene diamine, triethanol-amine, tri-isopropanolamine, N-methyl-diethanolamine, N-ethyl-diethanolamine, N,N-dimethylethanolamine, 2-(dimethylaminomethyl)-phenol, 2-(dimethylaminomethyl)-4-isononylphenol.

Compounds having blocked amine nitrogens are those compounds in which the amines per se are only freed at elevated temperature, for example reaction products of dimethylamine, diethylamine, dibutylamine, diphenylamine, N-methylamine, pyrrolidone, piperidine or imidazole with isocyanates, and reaction products of amines with carbonyl compounds, such as butyraldehyde-aniline and crotonaldehyde-ammonia and ammonium salts, such as quaternary ammonium salts of Mannich bases, such as 2-(trimethylammonium-methyl)-cyclohexanone chloride (U.S. Pat. No. 2,950,262) or tertiary ammonium salts of organic acids, such as triethyl ammonium-trichloro-acetate, bis-trimethyl ammonium oxalate, N-ethyl-morpholinium acetate, N,N-dimethylbenzylammonium-propionate, triethylene diammonium-diacetate, bis-dimethyl ethanol ammonium-succinate or cyclic or bicyclic amidines, such as 2,3-N-dimethyl-tetrahydro-$^1\Delta$-pyrimidine.

Metal catalysts, such as are known in relation to conventional wire lacquers, for example Pb- and Zn-octoate and -naphthenate, and titanium esters, may be added to the above-mentioned compounds to achieve particular effects.

The present lacquers represent considerable progress from a commercial point of view.

Without the addition according to the present invention, the requisite flexibility of the coating may only be guaranteed by the strict observance of certain operating conditions. The maximum outer fibre extension serves as a measurement for the flexibility. If a lacquered wire is longitudinally extended by 25% and then wound round a mandrel, then this represents a maximum extension of the coating of 88%. If the extension is insufficient, cracks or even scaling occurs. The present process ensures that even if the drawing velocity is substantially raised, the resulting coating has a value of 88%. It is equally surprising that the excellent flexibility value is maintained even if the lacquering speed is lowered, corresponding to a rise of the degree of stoving.

The effect of the present lacquer is thus based on a substantial increase of the possible lacquering speeds with simultaneous desensitisation to fluctuations in the stoving conditions.

The effect may thus be characterised as follows: markedly more rapid and simultaneously markedly safer.

The improvements which are achieved are substantiated in the following Examples.

EXAMPLE 1

75 g of 4,4'-diisocyanatodiphenyl methane and 2 g of phenyl isocyanate are dissolved in 70 g of toluene and 70 g of chlorobenzene. After addition of 0.5 g of phospholine oxide (a mixture of 1-methyl-1-phospha-2-cyclopentene-oxide and 1-methyl-1-phospha-3-cyclopentene-1-oxide), the mixture is heated for 2½ h to from 60° to 65° C., a gas meter being connected thereto.

100 g of phenol are added to the polycarbodiimide suspension at 45° C. and a solution of 44 g of maleic acid monomethyl ester (total acid number 422, partial acid number 396) in 60 g of phenol is stirred in at 25° C. and the temperature is raised to from 75° to 80° C. The mixture is then heated to 180° C. over a period of 4 h while distilling off toluene/chlorobenzene. After ½ h at 180° C., 40 g of m-cresol 70 and, after a further 2 h, 35 g of m-cresol 70 are added. After a further ½ hour at 180° C., the mixture is cooled to 140° C., diluted with 15 g of xylene and a clear brown-red polymer solution is obtained having a solids content of 31.3% (stoved for 5 minutes at 360° C.) and a viscosity of 1520 mPas (15% diluted with m-cresol 70, measured at 20° C. in a Höppler viscosimeter).

The resulting mixture is diluted with a mixture of cresol/xylene in a ratio of 1:1 to a solids content of 22% before being applied to a copper wire.

During lacquering, the wire generally passes through a lacquering bath, downstream of which the excess lacquer is subsequently stripped off by a specialised stripping system.

The wire then passes through a stoving furnace, in which the solvent evaporates under the effect of heat and the coating hardens. This process is repeated several times until the requisite coverage is achieved. From 6 to 8 passages are required in most cases.

The increase in the diameter of the wire to be achieved by the lacquering is laid down in DIN 46 416.

Lacquering is carried out under the following experimental conditions:
Length of furnace: 4 meter
Temperature of furnace: 400° C.
Lacquer stripping system: Nozzles
Graduation of nozzles: 0.76, 0.76, 0.78, 0.78, 0.80, 0.80.
Diameter of wire: 0.7 mm
Increase of diameter by lacquering: 40–50 μm
Results without addition of amine:
  At a drawing speed of 10 meters/min and 11 meters/min, the coating has a flexibility value of 88%. At a lacquering speed of >10 m/min and <11 m/min, the outer fiber extension drops markedly.

If however, 0.5% of dimethyl ethanol amine, based on the solids content, is added before lacquering the value of 88% is achieved within the velocity range of from 8 to 17 m/min.

EXAMPLE 2

1000 g of 4,4'-diisocyanatodiphenyl methane and 45.2 of caprolactam are heated to 100° C. for 15 minutes in 1360 g of toluene. The mixture is then cooled to 40° C. and 4 g of methyl phospholine oxide (commercial mixture of 1-methyl-1-phospha-2- and 1-methyl-1-phospha-3-cyclopentene-1-oxide) are added. The carbodiimide is formed with the evolution of $CO_2$.

The temperature is raised to 50° C. as a function of the development of gas and held there until no more $CO_2$ evolves, 1360 g of methylene chloride then being added. A stable solution of the varied polycarbodiimide is obtained (which has IR-bands at 2150 cm$^{-1}$ which are characteristic of carbodiimides). The mixture is then cooled to 40° C. and 200 g of phenol are added at this temperature and then, with cooling, 496 g of maleic, acid monomethyl ester are added batchwise. A stable solution of polyhydantoin ester which has been substituted with acylurea end groups is obtained. The solution is mixed with 1480 g of a mixture of equal parts of phenol and a commercial cresol mixture. The temperature is then raised to 180° C. over a period of about 6 hours and methylene chloride and toluene distill off. The process is interrupted at 90° C. and 38.4 g of trimellitic acid anhydride are added. When, after further heating, the temperature reaches 180° C., 1480 g of phenol/cresol are introduced and the mixture is stirred for 4 hours at this temperature. A 33% solution of the varied polyhydantoin ester is obtained (viscosity 24=13900 mPa.s, having bands at 1715 and 1775 cm$^{-1}$ in the IR spectrum which are characteristic of hydantoin.

This lacquer is diluted with cresol/xylene (2:8) to a solids content of 27% and is applied to a Cu wire having a diameter of 0.7 mm in a vertical furnace, 4 m in length, at a furnace temperature of 400° C. until the diameter has increased by from 40 to 50 μm.

At a lacquering speed of 15.14 and 16 m/min a coating is obtained which has the flexibility value of 88% in the relevant test.

If, however, 1% of butyraldehyde-aniline, based on the solids content, is added to the solvent mixture used for dilution, the improvement in the flexibility is so pronounced that the 88% is maintained within the lacquering speed range of from 12 to 21 m/min.

EXAMPLE 3

In accordance with Example 2 and with the quantity ratios given therein, a solution of the polyhydantoin ester is produced in toluene/methylene chloride/phenol. The mixture is then diluted with 1200 g of phenol/cresol, the temperature 79.6 g of bis-(methoxycarbonyl-isopropyl-amino-phenyl(4))-methane are introduced. The mixture is then again diluted with 1400 g of phenol/cresol and the temperature is raised to 180° C. over a period of about 5 hours. Methylene chloride and toluene distill off. The solvent may distill off under reduced vacuum. After 4 hours at 180° C., a clear solution of the polyhydantoin is obtained (viscosity$^{25}$=51600 mPa.s, having bands at 1715 and 1780 cm$^{-1}$ in the IR spectrum).

This lacquer is diluted with cresol/xylene in a ratio of 1:9 to a solids content of 28% and a wire having a diameter of 1.0 mm is lacquered therewith.

Lacquering conditions:
Length of furnace: 5 m
Temperature of furnace (recirculating furnace with the catalytic combustion of the solvents): 630° C.
Stripping system: nozzles
Graduation of nozzles: 1.06, 1.08, 1.08, 1.10, 1.10, 1.10, 1.12, 1.14.

Without the addition of amine, the flexibility value of 88% may only be achieved up to a lacquering speed of 42 m/min.

If 1.5% of a mixture of triethylene diamine and dimethyl-ethanolamine in a ratio of 1:4, based on the solids content, are added to the lacquer, the lacquering speed may be raised to 60 m/min without the outer fiber extension of the resulting coating falling below 88%.

EXAMPLE 4

174 g of a commercial mixture of 80% 2,4- and 20% 2,6-toluylene diisocyanate are reacted in 400 g of toluene with 11.3 g of caprolactam at 100° C. to produce an acylurea and, after addition of 1 methyl-phospholine oxide at 50° C., to produce a polycarbodiimide 340 g of methylene chloride and 50 g of phenol are then added and 123.5 g (0.95 mols) of maleic acid monomethyl ester are added dropwise with cooling. The mixture is then mixed with 200 g of phenol/cresol, the temperature is raised to 70° C. and 9.6 g of timellitic acid anhydride are added. The temperature is then further raised to 180° C., the mixture is then diluted with 265 g of phenol/cresol and the mixture is stirred for a further 5 h at 180° C. A solution of the polyhydantoin ester having a solids content of 33%, by weight, is obtained (viscosity$^{25}$=6200 mPa.s, IR bands at 1720 and 1775 cm$^{-1}$).

A sample of this hydantoin solution is diluted to a solids content of 25%, a stoving sheet is coated with this solution and is stoved after the remaining film of lacquer has run off. With solvent at 250° C., 30 min are required to produce a film which does not scale off when the sheet is bent.

After addition of 1% Pb octoate having a lead content of 8% and 0.5% crotonaldehyde-ammonia a temperature of only 200° C. is required.

I claim:
1. Lacquers for the production of coatings based on hydantoin group-containing polymers prepared by admixing i) from 0.01 to 10%, by weight, based on the solids content, of compounds containing one or more primary, secondary or tertiary amine nitrogens and ii) a solution of hydantoin group-containing polymers.
2. Lacquers according to claim 1 wherein the amine nitrogen-containing compounds comprise a butyraldehyde-aniline condensate.
3. Lacquers according to claim 1 wherein the amine nitrogen-containing compounds comprise 1,4-diazabicyclo-[2,2,2]-octane.
4. Lacquers according to claim 1 wherein the amine nitrogen-containing compounds comprise a 20%, by weight, solution of 1,4-diazabicyclo-[2,2,2]-octane in dimethyl-ethanolamine.
5. In a coated substrate, the improvement comprises said coating being a lacquer according to claim 1.
6. In a lacquer coated wire, the improvement comprises said lacquer coating being a lacquer according to claim 1.

* * * * *